(12) United States Patent
Kalbratt

(10) Patent No.: US 8,572,377 B2
(45) Date of Patent: Oct. 29, 2013

(54) METHOD FOR AUTHENTICATION

(75) Inventor: Benny Kalbratt, Gothenburg (SE)

(73) Assignee: Sign2pass Technologies AB, Partille (SE)

( * ) Notice: Subject to any disclaimer, the term of this patent is extended or adjusted under 35 U.S.C. 154(b) by 115 days.

(21) Appl. No.: 12/994,235

(22) PCT Filed: May 27, 2009

(86) PCT No.: PCT/EP2009/056458
§ 371 (c)(1),
(2), (4) Date: Nov. 23, 2010

(87) PCT Pub. No.: WO2009/144247
PCT Pub. Date: Dec. 3, 2009

(65) Prior Publication Data
US 2011/0088087 A1    Apr. 14, 2011

Related U.S. Application Data

(60) Provisional application No. 61/129,516, filed on Jul. 2, 2008.

(30) Foreign Application Priority Data

May 27, 2008    (EP) .................................... 08156955

(51) Int. Cl.
*H04L 9/00*    (2006.01)
(52) U.S. Cl.
USPC ............................. 713/168; 380/44; 380/277
(58) Field of Classification Search
USPC ............. 380/277–279, 44, 46; 713/168–171, 713/178, 189; 726/2–4, 6–7
See application file for complete search history.

(56) References Cited

U.S. PATENT DOCUMENTS

| | | | |
|---|---|---|---|
| 4,578,530 A | * | 3/1986 | Zeidler ........................... 705/71 |
| 5,604,800 A | * | 2/1997 | Johnson et al. ............... 713/189 |

(Continued)

FOREIGN PATENT DOCUMENTS

| | | |
|---|---|---|
| WO | 96/29667 A1 | 9/1996 |
| WO | 01/18720 A1 | 3/2001 |

(Continued)

OTHER PUBLICATIONS

International Search Report: PCT/EP2009/056458.

*Primary Examiner* — Hosuk Song
(74) *Attorney, Agent, or Firm* — Ladas & Parry LLP

(57) ABSTRACT

A method for authentication of a first party, A, to a second party, B, by a trusted third party, C, is disclosed. A is registered at C, and the method comprises the steps of receiving a identification data of A from A; determining, based on the identification data, if A has the right to request a random private key, RPK; and generating a temporary RPK. Further, C combines the RPK and a random open key, ROK, to form a single use temporary master authentication code; transmits the RPK to A; and, upon receipt of the RPK and the ROK from B, determines if the received RPK and ROK matches a valid single use temporary master authentication code; and authenticates, in case of match, A to B. The first party, A, may be any handheld device, such as a mobile phone, or a PDA, or a stationary device, such as a stationary computer or an ATM. The communication between the parties may be wired or wireless. A corresponding system is also disclosed.

16 Claims, 5 Drawing Sheets

(56) References Cited

U.S. PATENT DOCUMENTS 5,661,803 A * 8/1997 Cordery et al. ................. 705/60
2006/0080545 A1   4/2006 Bagley
2006/0117173 A1   6/2006 Deblock et al.

FOREIGN PATENT DOCUMENTS

| WO | 02/35487 A2 | 5/2002 |
| WO | 2006/075917 A2 | 7/2006 |

* cited by examiner

METHOD FOR AUTHENTICATION

TECHNICAL FIELD

The present invention relates to a method for authentication of a first party to a second party, by a trusted third party. The present invention also relates to a corresponding system.

BACKGROUND OF THE INVENTION

Methods for identification of one party to another party that are communicating via electronic media are widely used. Examples of applications where identification of the user is needed are withdrawing from an ATM, controlling a remote computer over the internet, using an internet banking system, performing a payment transaction when webshopping, etc. Several well known principles exist within this field of technology.

Conventionally authentication has been performed via user name and password, offering a relatively low security. For a higher security the so called two factor authentication has been used, meaning that a combination of for example something the user knows and something the user has, such as a PIN and a bank card, are needed for authentication. An example of such an authentication is described in WO2006075917 where a security code represents both the user and the user device.

Although providing a method with a higher security than conventional methods, a problem with the method disclosed in WO2006075917 is that the entire code is created in the user device, by means of an algorithm which is based upon a user personal code, a user device ID and if necessary a service provider code, to be compared to a corresponding code at the service provider, meaning that the entire code exists in its complete form, and is stored in both the user device and the service provider, which reduces the security. Another problem with the method disclosed in WO2006075917 is that the code can be associated to a certain user.

Further, several of the conventional methods for identification are only adapted for remote communication between two parties, such as the method disclosed in WO0235487, which limits the range of use considerably.

Common problems of conventional methods for authentication are that they are often complicated to use and/or do not provide a high enough security level. Further, it is often possible to eavesdrop a communication within such a method to get information about for example codes and transactions. Yet another problem with the methods used today is that the predictability often is high.

There is therefore a need for more secure methods for authentication of a first party, e.g. a service user, to a second party, e.g. a service provider, communicating via electronic media. Further, there is a need for secure methods for authentication which are less complicated to use.

SUMMARY OF THE INVENTION

In view of the above-mentioned and other drawbacks of the prior art, it is an object of the present invention to provide a secure method for authentication of a first party to a second party by a trusted third party, that at least partly overcomes the above-mentioned problems. This object is achieved by means of a method for authentication of a first party to a second party, by a trusted third party, and a corresponding system according to the appended claims.

According to a first aspect of the present invention there is provided a method for authentication of a first party to a second party, by a trusted third party, the first party being registered at the trusted third party. The method comprises the steps of:

receiving an identification data of said first party from the first party;

determining, based on said identification data, if said first party has the right to request a random private key;

generating a temporary random private key;

combining the random private key and a random open key to form a single use temporary master authentication code;

transmitting said random private key to said first party;

upon receipt of the random private key and the random open key from the second party, determining if said received random private key and random open key matches a valid single use temporary master authentication code; and authenticating, in case of match, said first party to said second party.

According to a second aspect of the present invention there is provided a method for authentication of a first party to a second party, via a trusted third party, the first party being registered at the trusted third party. The method at the first party comprises the steps of:

transmitting identification data of said first party to the trusted third party;

receiving a temporary random private key from the trusted third party, said random private key and a random open key forming a single use temporary master authentication code; and transmitting said random private key to the second party, said first party being authenticated to said second party in case of match between said random private key and a random open key held at the second party and a valid single use temporary master authentication code at the third party.

The method of the present invention is based on the realization that a random private key and a random open key may be combined into a single use temporary master authentication code by the trusted third party, and that the single use temporary master authentication code must match a received random private key and random open key from the second party to authenticate the first party to the second party. Hereby, the two parts of the temporary master authentication code can be distributed in different ways, and storage and handling of the entire temporary master authentication code can be minimized. This enables a highly secure and reliable authentication process, and which is still very efficient and simple to use.

The random private key is only created and transmitted to the first party by the trusted third party on request from the first party, which occurs when the trusted third party receives identification data from the first party, resulting in that the entire code only exists the moment the first party needs it. In other words, the entire code is only stored in the trusted third party when the first party requests authentication. The single use temporary master authentication code is further preferably only valid for a single use, an may be associated to a certain criteria, such as limited for use only for a certain transaction or to be valid only during a certain time period, before the end of a preset expiration time. In addition, the entire code exists at the second party only at the moment when it is received by the second party, and before it is transmitted to the trusted third party. The entire code being available only the moment when it is used provides a high security. Further, the transmittal of confidential information to the second party may in this way be fully at the discretion of the first party, which is then rendered full control of the authentication process.

Thus, an advantage of the present invention is that the first party may be unknown to the second party, since the authentication process is performed via the trusted third party. Further, an advantage is that the first party does not need to transfer any ID to the second party. However, the first party also communicates directly with the second party, which feels more natural and is more effective than if all communication would pass a trusted third party. The direct communication between the first party and the second party makes the method of the present invention suitable for usage in for example stores.

The random private key is provided to the first party from the trusted third party, and preferably only immediately before the intended use, which has the advantage that the user does not have to remember the code or keep it stored anywhere. Accordingly, it is easy to use the method of the present invention, and the user friendliness is therefore high. The code neither being stored by the first party, nor revealing the identity of the first party also contribute to make the method secure.

The above-discussed use of the random open key and the random private key to form a single use temporary master authentication code makes it possible to have a very limited information transfer between the first and second party. In some realizations, it suffices that the random private key is transferred from the first party to the second party, thus avoiding the need to transfer ID information and the like. An advantage of the present invention is that the first party does not need to transmit its identification data to the second party, since the random private key in combination with the random open key carries the identity of the first party.

Preferably, the random private key comprises a sequence of alphabetic and/or numeric characters. The random private key itself does not have to be unique, but forms a unique temporary master authentication code in combination with the random open key.

The random open key preferably comprises a sequence of numeric and/or alphabetic characters. The random open key may further be divided into segments, wherein one of the different segments may be random while the other segments may define for example some of, but not limited to, the type of transaction requested, the identity of the trusted third party, or a geographical location, such as a region. The length of the random open key may be configurable depending on the application where it is used, so that the length is increased when higher security levels are needed.

Accordingly, the single use temporary master authentication code being a combination of the random private key and the random open key, forms a code which cannot in itself be related to a specific party, which further increases the security. The code may be completely random or, alternatively, be created by means of an algorithm. The code is preferably unique, at least during its expiration time. As an example, a random open key may have a length of 6 characters from 0 to 9, and the two first positions may be dedicated to define e.g. usage region and type of usage, and consequently in this example there remains 4 characters which could be random and create up to 10000 different values. If the random private key contains 7 characters A-Z and 0-9 and the complete key is random, the total number of random private keys comprises about 78 billion available combinations. In a single use temporary master authentication code the total number of available combinations for a specific region and service could therefore in this example be about $8*10^{14}$.

Further, at least one of the random private key and the random open key may be generated by means of an algorithm.

Moreover, the entire master authentication code may be generated by an algorithm.

Furthermore, the algorithm may be put in at least one of the trusted third party and the second party. If the algorithm is put in more than one of the parties these algorithms may be synchronized to be able to create the same code simultaneously. In this way, the method of the present invention may be used even if the second party is not communicating online with the trusted third party. Thus, it may be possible to generate one or both of the random open key and random private key in any of the first to third party, or to generate different parts of the master authentication code in different parties, or even generate redundant duplicates of whole or parts of the master authentication code in different parties.

Further, at least one, and preferably both, of the random private key and the random open key is/are temporary. By "temporary" is in this context to be understood that the expiration time of the keys is limited to a certain time period, such as a month, a week, a day or even minutes, whatever time that is reasonable depending on the type of application etc. Moreover, if a session is complete, the codes may be set to be invalid, although the expiration time is not reached. When an expiration time has been passed the temporary codes may immediately be invalidated and put into quarantine for a specified time interval. As a result, if one of the temporary random open key, or the temporary random private key is invalidated, no session with the valid corresponding random private key or random open key, respectively, may be found, for a higher security, and a stronger protection of the first party, against for example phishing.

Furthermore, the single use temporary master authentication code is unique as long as it is used in an authentication. There can not be two similar codes valid simultaneously for two different authentications.

To further increase the security of the method of the present invention all or at least a part of the communication between the first party and the second party, the first party and the trusted third party, and the second party and the trusted third party may be encrypted.

As used in this application, "authentication" relates to the concept of establishing the authencity of one party to another. This is typically used for authorization, i.e. to grant authority or give permission for a specified request, such as allowing access to resources only to those permitted to use them. Authorization is a process that protects computer resources by only allowing those resources to be used by parties that have been granted authority to use them.

In the context of this application, authenticating specifically means an identity transaction, although for example a payment transaction or a ticket transaction may be a part of the identity transaction.

The trusted third party may further log the performed transactions, and if needed, distribute them as receipts to the involved parties.

In the context of this application, "registration" is used to indicate the existence of a record comprising identification information etc about an external party. The first party is registered at the trusted third party, making it possible for the first party to log in or perform other activities within the system hosted by the third party. The registration preferably follows conventional methods for registration of one party to another party communicating via electronic media. In an exemplary registration phase, the first party provides a mobile number to an ID provider to obtain a one time code, often via email, which code allows the first party to connect to the trusted third party. A user account is created at the trusted third party, wherein a global user ID, the mobile number and the one time code is registered. Further, the trusted third party sends the ID application to the first party, and the first party chooses a personal identification code in combination with transmitting the one time code, for the user data of the first party to get registered at the trusted third party. The application may send the mobile number and for example IMEI automatically.

Also the second party is preferably registered at the trusted third party, even though this is not a necessary requirement for exercising the present invention.

For example, the first party and the second party may each have an agreement with an identification service provider, which may be two different identification service providers or the same identification service provider. The identification service provider(s) is preferably a company or a governmental department being able to guarantee a user identity. Other examples of identification service providers are banks, card issuing companies, and phone operators. The third party may have an agreement with the identification service provider, being able to obtain identification data from the database of the identification service provider. Alternatively, the identification service provider may be a part of the trusted third party.

The authentication of the first party and the second party to the trusted third party may be carried out using for example a wearable public key infrastructure, WPKI, or hardware solutions, such as an hardware component on a SIM card or in a mobile phone.

As used in this application, "identification data" refers to data that makes it possible for a party to identify another party, for example a user or a device, and is preferably unique for the specific user or device. Identification data may generally be something that the user knows, such as a PIN or a password, something the user has, such as a security token or a mobile phone, or something the user is or does, such as voice recognition or a fingerprint. Specifically, identification data for the first party preferably involves personal identification codes, various device IDs, various domain IDs or combinations of these. It is specifically preferred that identification data comprises a personal identification code and a device ID, such as an identification of a mobile phone, a so called international mobile equipment identity (IMEI), or a network adapter identifier, such as a media access control (MAC) address.

According to one embodiment of the present invention, the random open key may be received in the third party in combination with said identification data of the first party. This enables for the trusted third party to obtain the random open key even if it is not created in the trusted third party, but in the second party. The trusted third party may then create a random private key based on the received random open key and form a valid single use random temporary master authentication code by combining the random private key and the random open key.

Thus, the random open key may be generated in the second party, and conveyed to the third party by the first party. However, alternatively, the random open key may be generated in the third party, and transferred to the second party, to enable for the second party to provide the random open key to the first party as a part of the authentication process.

In case the random open key is to be conveyed to the third party via the first party, the random open key is preferably received by the first party from the second party prior to transmitting the identification data and the random open key to the trusted third party. Thus, the random open key is as well as the random private key provided to the first party, and does not have to be stored or remembered by the first party, which contributes to the ease of use of the method of the present invention.

In case the trusted third party creates the random open key and provides it to the second party, the random open key could be used as a part of identification of the related second party to further increase the user control of the transaction.

In case the second party creates the random open key the sequence of characters could be used to make it more difficult to find a possible second party which is able to process a related random private key by an unauthorized party.

According to another embodiment of the present invention a global user ID for the second party may be received in combination with the identification data for the first party.

As used in this application "a global user ID" refers to an identifier which uniquely identifies a party of an organization. A global user ID may be any unique sequence of characters and may for example be a telephone number, a customer number or an employment number. The global user ID is preferably not secret.

The global user ID may be created by for example the trusted third party, an identification service provider or by the user. Receiving a global user ID for the second party in combination with identification data of the first party is a way for the trusted third party to secure the identity of the second party involved in the current authentication.

Alternatively, the random open key may be generated by the third party and transmitted to the second party only after reception of the identification data from the first party.

The trusted third party may also create a reference number which is transmitted to the second party in combination with the random open key, and which is also transmitted to the first party in combination with the random private key.

Alternatively, the IP-address of the second party is also transmitted to the first party from the trusted third party in combination with the reference number and the random private key, that is if the first party does not already hold this information in for example an infocard of the second party.

In this stage, both the first party and the second party are prepared for an authentication process to be executed, although the second party is not aware of which first party that is involved in the current process until the execution is initiated by the first party.

When a global user ID of the second party is used to identify the second party, and transmitted to the trusted third party from the first party, the random open key is preferably created by the trusted third party. The trusted third party is then able to create the random private key based on the created random open key and form a valid single use temporary master authentication code. The random open key is then transmitted to the second party, in order for the second party to combine it with a received random private key, and transmit the combined single use temporary master authentication code to the trusted third party for authentication of the first party, if the received and valid single use temporary master authentication code match.

The reference number may be used when the random open key is not transmitted via or created by the second party. The reference number may be transmitted from the first party to the second party in combination with transmitting the random private key. The second party may then translate the reference number to the random open key since the random open key and the reference number was sent in combination from the trusted third party in an earlier step, and the authentication can be performed.

In this way the second party may be without knowledge of that an authentication will take place until it is initiated by the first party, e.g. when transferring money to an account of the second party, when approving for example a payment or when initiation and execution occurs at two different occasions.

Another advantage is that the reference number connects the first and the second parties to the specific transaction, since the authentication only can relate to the second party holding the relevant reference number and random open key. Moreover, identification data of the second party may be received in combination with receiving the random private key and the random open key from the second party, as a way for the trusted third party to secure the identity of the second party.

According to a third embodiment of the present invention, to further secure that the first party is to be authenticated to the second party, the step of authenticating may further comprise the steps of:

transmitting a challenge request to the second party, to be conveyed to the first party; and receiving a challenge response from the second party, originating from the first party.

An example of a challenge-response authentication is password authentication, the correct password being the valid response. Other examples of challenge-response algorithms are zero-knowledge password proof and key agreement systems.

Alternatively, or complementary, for the single use temporary master authentication code to be valid for a single use, the method may comprise the step of setting of an expiration time for the single use temporary master authentication code, whereby authenticating is performed in case of a valid expiration time.

The expiration time may be predetermined, starting from when the random private key is created on request from the first party. For a sensitive transaction the time is set to be as short as possible, but long enough for the first party to receive the random private key and to transmit it to the second party plus adequate overhead.

Taking into account overhead caused by e.g. the network speed towards the first party and from the second party and other factors such as the users ability to write, a required minimum of the expiration time could e.g. be calculated to be two minutes. On the opposite side, if the code is used as a verification of a service of any kind, such as a ticket, the expiration time could be several weeks or more.

Alternatively, the expiration time is flexible depending on the usage area for the specific code. The expiration time is hence to be controlled where the single use temporary master authentication code is created and managed, such as by the trusted third party.

When the expiration time has been passed the temporary authentication code is immediately invalidated and put into quarantine for a specified time interval. It this way it can easily be noticed if a temporary authentication code is tried repeatedly by fraud, after the code has expired. In addition, there is no risk that two identical codes are generated directly after each other.

Preferably, the communication between the first party and the second party occurs through a first channel and the communication between the first party and the third party occurs through a second channel. The first and second channel are separated from each other. At least one of the channels may be a wireless communication channel, e.g. accessible via a mobile phone.

The first party preferably communicates with the second party trough an end application provided by the second party, such as a web application in a web browser, while the first party communicates with the trusted third party via another application, such as an ID application. The second party shows or provides the random open key to the first party via the end application for example through a user interface of a computer, an ATM, via any kind of near field communication technology, such as RFID or bluetooth, or via a private or public network.

Both applications may run on the same device, but in the context of the present invention the applications preferably run on two different devices e.g. an ATM and a mobile phone. Keeping the two communication channels separated contributes to make the method both secure and flexible, since for example eavesdropping the communication flow of one channel will not reveal the entire code.

According to further aspects of the present invention, it also relates to a corresponding system. Accordingly, it relates to a system for authentication of a first party to a second party, by a trusted third party, the first party being registered at the trusted third party, comprising:

means for determining, based on identification data received from the first party, if said first party has the right to request a random private key;

a key generator generating a temporary random private key, said random private key and a random open key in combination forming a single use temporary master authentication code;

means for transmitting said random private key to said first party;

means for determining, upon receipt of the random private key and the random open key from the second party, if said received random private key and random open key matches a valid single use temporary master authentication code; and means for authenticating, in case of match, said first party to said second party.

Similarly, the invention also relates to a system for authentication of a first party to a second party, via a trusted third party, the first party being registered at the trusted third party, wherein the first party comprises:

means for transmitting identification data of said first party to the trusted third party;

means for receiving a temporary random private key from the trusted third party, said random private key and a random open key forming a single use temporary master authentication code; and means for transmitting said random private key to the second party, said first party being authenticated to said second party in case of match between said random private key and a random open key held at the second party and a valid single use temporary master authentication code at the third party.

Advantages and features of these aspects of the present invention are analogous to those described above in connection with the first aspects of the invention.

Other advantages and embodiments of the present invention will be apparent from the appended claims and the following detailed description.

BRIEF DESCRIPTION OF THE DRAWINGS

In the following, embodiments of the present invention will be described in detail, with reference to the accompanying, exemplifying drawings on which.

DETAILED DESCRIPTION OF PREFERRED EMBODIMENTS

Figure 1:
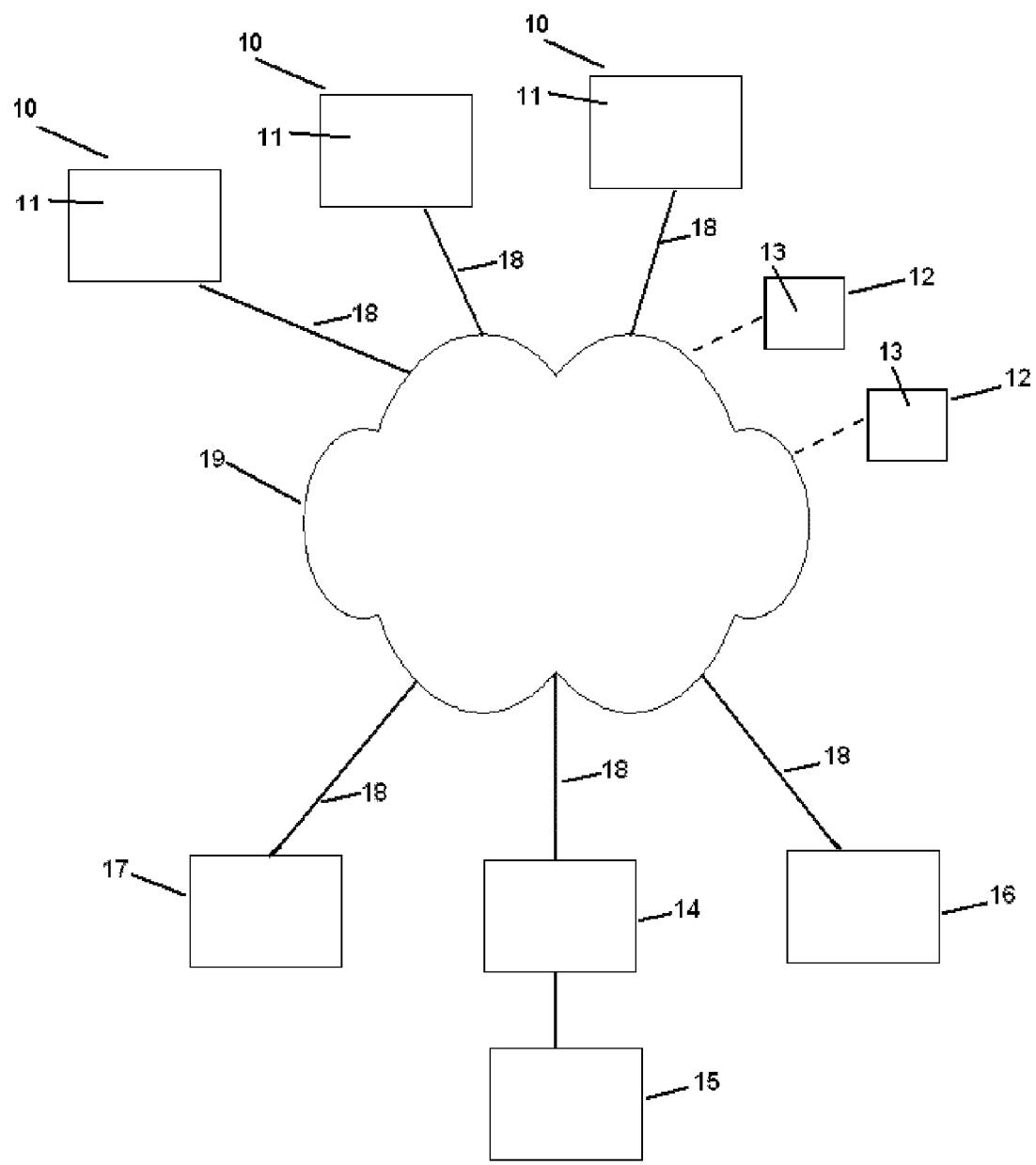
FIG. 1 is a block diagram illustrating an overview of an example of a network structure in which the methods of the present invention can be used.

An overview of an example of a network structure in which the present invention can be used is illustrated in FIG. 1.

The illustrated network structure comprises a number of units 10, 12 and 14-17, in communicative connection via a communication network 19. The connection to the units may be wired, indicated by full lines in FIG. 1, or wireless, indicated by dashed lines in FIG. 1. The network 19 may be a public, semi-public or private network, for example internet or a private corporate network.

In the following description, some of the units are denoted first party 12, i.e. a unit requesting authentication, some units are denoted second party 10, from which authentication is requested, and some units are denoted trusted third party 15, by which the authentication is provided. In principle, any unit may take the role of first, second or third party, and a unit may also take the role of more than one of first, second and third party in different authentication processes. Still further, there may be more than one first, second and third party. In the following exemplary set-up, units 10 are denoted second parties, units 12 are denoted first parties and unit 15 is denoted third party.

The second party provides or hosts an end application 11 that is visible to the user via an interface of for example a computer and through which application 11 the first party 12 communicates with the second party. The end application 11 may be a web application in a web browser, a cash register used for transactions in for example a store, a logon page in a private system, an embedded software in a vending machine, an ATM system or a building entrance system, or an embedded software in an automated solution such as an electronic door lock, etc. The end application 11 is typically requiring identification from the first party 12, e.g. by means of a login page, a registration page or a purchase payment step in a web shop.

The trusted third party 15 is the system that creates the temporary private keys used for identification and authentication of the first party to the second party.

For request of authentication, the first party 12 communicates with the trusted third party 15 through another application, an ID application 13, provided or hosted by the trusted third party 15. The ID application 13 preferably runs on a portable device, such as a mobile phone, a PDA, or any other portable device which is able to communicate with a network and comprise an application, an embedded software, a link to a webpage etc.

The end application 11 and the ID application 13 may also run on the same device, such as the portable device 12.

The ID broker 14 is the main system securing and handling the transactions between the end application and the ID and service providers. In a so called public system the ID broker connects different trusted third parties, whereas the trusted third party also acts as ID broker in a so called closed system.

ID and service provider 16 is the trusted institution or institutions that provide(s) information about the first party and the possibilities of the first party to be authenticated. The ID and service providers may be one or many using the same technology for providing safe identification.

The end application server 17 is a server for a number of end applications, such as a web server, a corporate login system, a customer login system etc. The end application server 17 may also be a server for a number of service providers, such as a bank server.

The network connections 18 from the components to the network 19 used for one unit to communicate between and interact with another unit may be any available technology used to connect to a network, such as Ethernet or GPRS. The portable devices 12 may be connected to the network by any technology, such as WAP, GPRS, WLAN or UMTS.

In FIGS. 2-5, A is the first party, such as a service user, B is the second party, such as a service provider, and C is the trusted third party. The arrows illustrate the communication flow between the parties.

Figure 2:
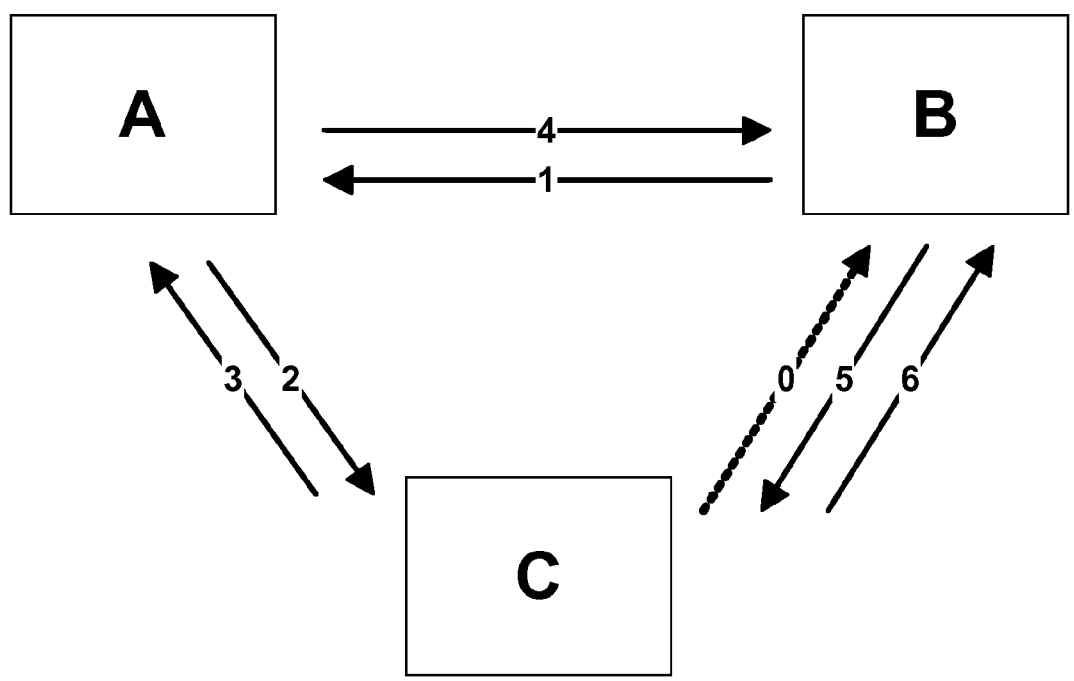
FIG. 2 illustrates an embodiment of the method of the present invention.

In FIG. 2 an example of the method of the present invention is illustrated.

In step 0 a random open key is transmitted from the trusted third party C to the second party B. The arrow is dashed since this step is optional, and used only if the random open key is generated by the trusted third party C. Alternatively, the random open key may be generated by the second party B.

In step 1 the random open key is transmitted from the second party B to the first party A, via an end application, such as a webshop.

In step 2 the first party A requests authentication to the second party B by transmitting the random open key and identification data for the first party A to the trusted third party C, via an ID application. The ID application may be arranged to forward ID information automatically when the random open key is entered and sent to the third party.

The trusted third party C generates a random private key by means of a random key generator or by means of an algorithm, combines it with the random open key to form the single use temporary master authentication code and preferably sets an expiration time for the usage of the code. The trusted third party C transmits the random private key to the ID application of the first party A in step 3.

In step 4 the first party A transmits the random private key to the second party B via the end application.

The second party B combines the received random private key with the previously known random open key to a single use temporary master authentication code, and transmits it together with identification data of the second party B to the trusted third party C, performing a so called service request, in step 5, and preferably over a secure network connection. Other information may also be transmitted, such as requests for a global user client ID, a password, the payment amount if the authentication involves a payment transaction, the position of the first party, etc.

Upon receiving the single use temporary master authentication code the trusted third party C determines if the code exists and is valid. If the code is valid the first party A is authenticated to the second party B, and the requested service data can be transmitted, in step 6.

All or parts of the communication between the first party A and the second party B may be input manually, or electronically via for example RFID, if the first party A and the second party B are located in close vicinity. If the first party A and the second party B are located on a distance from each other the transfer may be executed over for example internet.

Further, all or parts of the communication between the parties may be encrypted. Another example of the method of the present invention is illustrated in FIG. 3.

Figure 3:
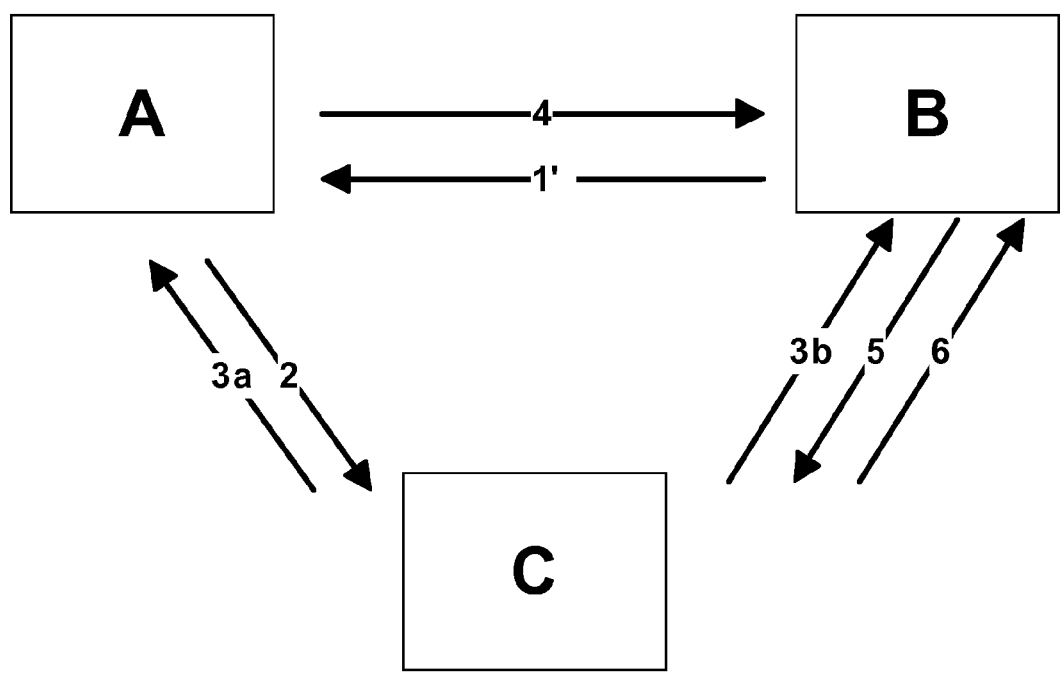
FIG. 3 illustrates another embodiment of the method of the present invention.

In FIG. 3 a global user ID for the second party B is transmitted to the first party A, via an end application, such as a webshop, in step 1'.

In step 2 the first party A request authentication in the same way as described in relation to FIG. 2, but instead of conveying the random open key, the global user ID for B is now transmitted from the first party A to the trusted third party C in combination with identification data for the first party A.

Alternatively, requests for other information is transmitted in combination with the identification data for the first party A, such as an infocard for identifying the second party B also stating the IP address of the second party, number of tickets and ticket type if the authentication involves ticketing, a payment request, the position of the first party, etc.

The trusted third party C generates a random private key, a random open key by means of a random key generator and preferably a reference number, combines the two keys to form the single use temporary master authentication code and preferably sets an expiration time for the usage of the code. The trusted third party transmits the random private key preferably in combination with the reference number to the ID application of the first party A in step 3*a*. In the example of FIG. 3, a reference number and service data for the second party B, such as ticket service data if the authentication involves ticketing, may be transmitted in combination with the random private key from the trusted third party.

In step 3*b*, the random open key, preferably in combination with the reference number, is transmitted to the second party B.

In step 4 the first party A transmits the random private key, and preferably also the reference number, to the second party B via the end application.

Step 5 and 6 are equivalent to step 5 and 6 in FIG. 2.

Figure 4:
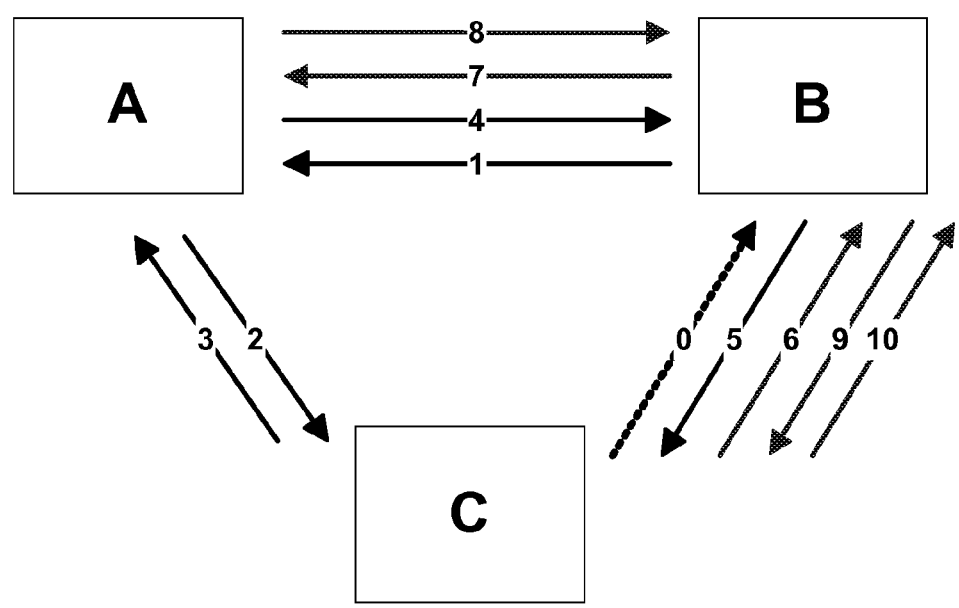
FIG. 4 illustrates an embodiment of the method of the present invention, comprising steps of challenge and challenge response.

Another example of the method of the present invention is illustrated in FIG. 4. In FIG. 4 steps 1-5 are equivalent to those of FIG. 2, and are denoted by the same numerals. Further, step 10 in FIG. 4 is equivalent to step 6 in FIG. 2.

In the example of FIG. 4, after step 5 wherein the received random private key and the previously known random open key are transmitted together with identification data of the second party B to the trusted third party C, a challenge, such as a request for a password, is transmitted to the second party B from the trusted third party C in step 6.

In step 7 the challenge is conveyed to the first party A, whereupon the first party A transmits a response to the second party B in step 8.

In step 9 the response is forwarded from the second party B to the trusted third party C, and step 10, authentication is granted if the response is valid.

Figure 5:
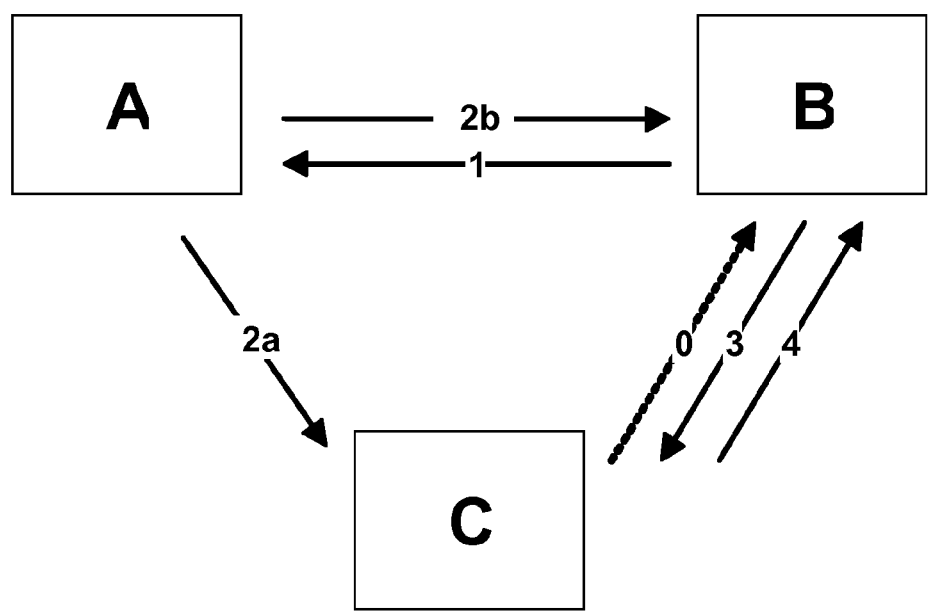
FIG. 5 illustrates an alternative embodiment of the method of the present invention.

An alternative solution is illustrated in FIG. 5. In FIG. 5 steps 0 and 1 are equivalent to those of FIG. 2, and are denoted by the same reference numerals. Further, step 3 and 4 in FIG. 5 are equivalent to step 5 and 6 of FIG. 2.

In the example of FIG. 5, after step 1, where the random open key is transmitted to the first party A from the second party B, the random private key is generated in the first party A, for example in a chip, by means of an algorithm, based on the received random open key.

The random private key is transmitted to the trusted third party C from the first party A in combination with transmitting the random open key and identification data for the first party A, in step 2*a*.

In step 2*b* the first party transmits the random private key and the random open key to the second party B. However, step 2*a* and 2*b* may be performed simultaneously, or in reverse order.

After step 3, where the second party B transmits the random open key and the random private key to the trusted third party C, the trusted third party C determines if the received random private key received from the first party A corresponds to the random private key received from the second party B.

If the code is valid the first party A is authenticated to the second party B, and the requested service data can be transmitted, in step 4.

The algorithm may be enclosed in the first party A, and depend on, in addition to the random open key, the global user ID from the first party A, the pin code and the time factor. This code is hence not random, but yet secure.

By means of this embodiment the need for calculation power in the trusted third party is decreased.

There are several fields of application for the present invention. Some of the fields are listed below:
1. Secure identification for the purpose of performing payments on the internet for a service or merchandise.
2. Secure identification for the purpose of performing payments in real life, such as in a store, a taxi, a restaurant or anywhere else.
3. Secure identification for the purpose of performing payments to a vending machine or other unattended service.
4. Secure identification for the purpose of performing cash out from an ATM machine.
5. Secure identification for the purpose of making a simple registration such as becoming a user of a service from someone on the internet.
6. Secure identification for the purpose of logging in to a website on the internet without having to remember a specific login and password combination.
7. Secure identification for the purpose of logging in to a corporate system in a private or public network.
8. Secure identification for the purpose of logging in to a corporate network in a private or public network.
9. Secure identification for the purpose of performing a cash transfer from one portable device to another without having to go to the bank.
10. Secure identification for the purpose of performing voting.
11. Secure identification for the purpose of entering an unmanned hotel.
12. Secure identification for the purpose of ticketing, for example in public transport.
13. Secure identification for the purpose of sending an invoice or a payment to a receiver or a group of receivers.

Many variations like the examples described above are possible within the scope of the invention. Further, the invention may be realized in a so called closed system, or a so called open system.

Instead of the user reading and typing the information to transfer it between the first party and the second party the invention could also use RFID or any other type of communication between the physical devices involved by each entity in a transaction. For example, if to use the present invention in a store the said ID application could communicate to said end application to both receive the random open key and to transmit back the random private key. It could also be possible to use a portable device communicating to the trusted third party through a secure communication channel provided by the physical embodiment of second party such as a card terminal, RFID receiving device or other thus preventing the user of the ID application to open a separate communication channel through his device. By means of this embodiment of the present invention a part of the verification process could be performed in the physical embodiment of the second party, which upon receiving of the random private key through the secure communication channel from the trusted third party immediately could go to the said state of waiting for the user to confirm the transaction.

Further, instead of storing identification service transaction data at the location of an identification service provider the data could be stored in the portable device to be transferred to either the trusted third party or directly to the second party once the transaction has been validated by the trusted third party, for example in an application or in a chip, the information being encrypted, thus making it possible to for example handle certain transaction types between the entities also in an offline mode i.e. when one or more components fail to communicate to each other. This could be used to verify a payment amount of a value up to a maximum level defined by the identification service provider.

As a part of the confirmation process, such as when the user confirms the requested transaction to be used in the second party, an implementation of a function such as a challenge/response functionality is feasible. For example, instead of confirming by pushing a button to accept the transaction the user could confirm the transaction by typing a response word, known only by user and trusted third party. This would prevent such attacks as phising since the response would only be given by the user in case the downloaded information service transaction data seems correct to the user. A functionality like this could be used when a maximum security is needed, for example when transferring large payments or logging in to a bank.

Further, to prevent fraud attempts the embodiment of the second party could be created so that a maximum number of tries is possible when the user enters his random private key before the end application switches the random open ID. This would make it very difficult to fraud the system since it would not be possible to setup a large botnet to crack the system.

It is also possible to make the password given by the first party and the second party to login with a specific global user ID to be a random private key as well, a random private client ID. This could be hidden in the background of the embodiment of the end application and the ID application. This can be a part of the authentication process between a and c, or b and c. Thus, when a user logs in to the trusted third party to perform a part of a transaction the trusted third party verifies the random private client ID is valid for a specific global user ID and logs the user in, creates a new random private client ID and returns this in the background to the client.

The invention has now been described by way of examples. However, it should be appreciated by someone skilled in the art that many modifications and variations are feasible. For example, the first, second and third party may be realized in many different ways, and on many different types of communicative units. Further, the new authentication process may be used for essentially any type of application requiring electronic authentication or authorization. Still further, the steps involved in the authentication scheme may be varied. For example, the random open key may be generated by the third party or by the second party, the forwarding of a random open key to the second party from the third party may occur before or after generation of the random private key, etc.

Alternatively, generating the random private key may be performed in the first party, for example in a chip, based on the received random open key from the second party. The first party may hence transmitt the random private key and the random open key to the trusted third party, as well as to the second party. The trusted third party may then determine if the random private key, which is received from the second party, matches the calculated random private key, which is received from the first party; and authenticate, in case of match, the first party to the second party. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A non transitory computer readable recording medium (CCRM) having coded instructions for carrying out a method for authentication of a first party (A) to a second party (B), by a trusted third party (C), the first party being registered at the trusted third party, the method comprising:
 receiving an identification data of said first party from the first party;
 and, in combination with receiving said identification data of the first party (A), receiving a random open key from the second party (B) via the first party (A);
 determining, based on said identification data, if said first party has the right to request a random private key;
 generating a temporary random private key;
 combining said random private key and the random open key to form a single use temporary master authentication code;
 transmitting said random private key to said first party;
 upon receipt of the random private key and the random open key from the second party,
 determining if said received random private key and random open key matches a valid single use temporary master authentication code; and
 authenticating, in case of match, said first party to said second party.

2. The CCRM method according to claim 1 further comprising having coded instructions, prior to receiving identification data from the first party (A):
 generating the random open key; and
 transmitting said random open key to the second party (B).

3. The CCRM method according to claim 1, wherein a global user identification (ID) for the second party (B) is received in combination with the identification data for the first party (A).

4. The CCRM method according to claim 1, further comprising having coded instructions, after the step of receiving said identification data from the first party (A):
 Generating the random open key; and
 transmitting said random open key to the second party (B).

5. The CCRM method according to claim 1, wherein an identification data of the second party (B) is received in combination with receiving the random private key and the random open key from the second party (B).

6. The CCRM method according to claim 1, wherein the step of authenticating further comprises the steps of:
 transmitting a challenge request to the second party (B), to be conveyed to the first party (A); and
 receiving a challenge response from the second party (B), originating from the first party (A).

7. The CCRM method according to claim 1, further comprising the step of setting of an expiration time for the single use temporary master authentication code, whereby authenticating is performed in case of a valid expiration time.

8. A non transitory computer readable recording medium (CCRM) having coded instructions for carrying out a method for authentication of a first party (A) to a second party (B), via a trusted third party (C), the first party being registered at the trusted third party, the method:

receiving a random open key from the second party (B);
transmitting identification data of said first party and the random open key to the trusted third party;
receiving a temporary random private key from the trusted third party, said random private key and the random open key forming a single use temporary master authentication code; and
transmitting said random private key to the second party, said first party being authenticated to said second party in case of match between said random private key and a random open key held at the second party and a valid single use temporary master authentication code at the third party.

9. The CCRM method according to claim 8, further comprising the step of:
receiving a challenge request from the second party (B); and
transmitting a challenge response to the second party (B).

10. The CCRM method of claim 8, wherein the communication between the first party (A) and the second party (B) occurs through a first channel and the communication between the first party and the third party occurs through a second channel, said first and second channel being separated from each other.

11. A non transitory computer readable recording medium (CCRM) having coded instructions for carrying out a method for authentication of a first party (A) to a second party (B), via a trusted third party (C), the first party being registered at the trusted third party, the method comprising:
receiving a global user identification (ID) for the second party (B) from the second party;
transmitting identification data of said first party and the global user ID to the trusted third party;
receiving a temporary random private key from the trusted third party, said random private key and a random open key forming a single use temporary master authentication code; and
transmitting said random private key to the second party, said first party being authenticated to said second party in case of match between said random private key and a random open key held at the second party and a valid single use temporary master authentication code at the third party.

12. A system for authentication of a first party (A) to a second party (B), by a trusted third party (C), the first party being registered at the trusted third party, comprising:
an end application configured to receive identification data from the first party in combination with a random open key received from the second party (B), via the first party (A);
an ID application configured to determine, based on identification data received form the first party, if said first party has the right to request a random private key;
a key generator generating a temporary random private key, said random private key and a random open key in combination forming a single use temporary master authentication code;
the ID application is further configured to transmit said random private key to said first party;
the ID application is further configured to determine, upon receipt of the random private key and the random open key from the second party, if said received random private key and random open key matches a valid single use temporary master authentication code; and
a hardware component configured to authenticate, in case of match, said first party to said second party.

13. A computer system comprising a processor and a memory, for authentication of a first party (A) to a second party (B), via a trusted third party (C), the first party being registered at the trusted third party, wherein the first party comprises:
an end application operating on the computer system and configured to receive identification data from the first party in combination with a random open key received from the second party (B), via the first party (A);
an ID application operating on the computer system and configured to transmit identification data of said first party to the trusted third party;
the ID application operating on the computer system is further configured to receive a temporary random private key from the trusted third party, said random private key and a random open key forming a single use temporary master authentication code; and
the end application operating on the computer system is further configured to transmit said random private key to the second party, said first party being authenticated to said second party in case of match between said random private key and a random open key held at a second party and a valid single use temporary master authentication code at the third party.

14. A non transitory computer readable recording medium (CORM) having coded instructions for carrying out a method for authentication of a first party (A) to a second party (B), by a trusted third party (C), the first party being registered at the trusted third party, the method comprises the steps of:
receiving an identification data of said first party from the first party;
and, in combination with receiving said identification data of the first party (A), receiving a global user ID for the second party (B) from the second party (B), via the first party (A);
determining, based on said identification data, if said first party has the right to request a random private key;
generating a temporary random private key;
combining said random private key and the random open key to form a single use temporary master authentication code;
transmitting said random private key to said first party;
upon receipt of the random private key and the random open key from the second party,
determining if said received random private key and random open key matches a valid single use temporary master authentication code; and
authenticating, in case of match, said first party to said second party.

15. A system for authentication of a first party (A) to a second party (B), by a trusted third party (C), the first party being registered at the trusted third party, comprising:
an end application configured to receive identification data from the first party in combination with a global user ID received from the second party (B), via the first party (A);
an ID application configured to determine, based on identification data received form the first party, if said first party has the right to request a random private key;
a key generator generating a temporary random private key, said random private key and a random open key in combination forming a single use temporary master authentication code;
the ID application is further configured to transmit said random private key to said first party;
the ID application is further configured to determine, upon receipt of the random private key and the random open key from the second party, if said received random private key and random open key matches a valid single use temporary master authentication code; and a hardware component configured to authenticate, in case of match, said first party to said second party.

16. A computer system comprising a processor and a memory, for authentication of a first party (A) to a second party (B), via a trusted third party (C), the first party being registered at the trusted third party, wherein the first party comprises:

an end application operating on the computer system and configured to receive identification data from the first party in combination with a global user ID received from the second party (B), via the first party (A);

an ID application operating on the computer system and configured to transmit identification data of said first party to the trusted third party;

the ID application operating on the computer system is further configured to receive a temporary random private key from the trusted third party, said random private key and a random open key forming a single use temporary master authentication code; and the end application operating on the computer system is further configured to transmit said random private key to the second party, said first party being authenticated to said second party in case of match between said random private key and a random open key held at a second party and a valid single use temporary master authentication code at the third party.

* * * * *